United States Patent
Papasakellariou et al.

(10) Patent No.: US 9,655,097 B2
(45) Date of Patent: *May 16, 2017

(54) APPARATUS AND METHOD FOR SUPPORTING TRANSMISSION OF SOUNDING REFERENCE SIGNALS FROM MULTIPLE ANTENNAS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,174

(22) Filed: Jan. 4, 2016

(65) Prior Publication Data

US 2016/0119906 A1 Apr. 28, 2016

Related U.S. Application Data

(63) Continuation of application No. 14/026,654, filed on Sep. 13, 2013, now Pat. No. 9,232,515, which is a
(Continued)

(51) Int. Cl.
*H04W 4/00* (2009.01)
*H04L 1/00* (2006.01)
(Continued)

(52) U.S. Cl.
CPC ......... *H04W 72/042* (2013.01); *H04L 5/0051* (2013.01); *H04L 5/0053* (2013.01);
(Continued)

(58) Field of Classification Search
CPC .. H04W 72/042; H04L 5/0051; H04L 5/0053; H04L 5/0094; H04L 27/2613
See application file for complete search history.

(56) References Cited

U.S. PATENT DOCUMENTS

2006/0035643 A1 2/2006 Vook et al.
2006/0182192 A1 8/2006 Takano
(Continued)

FOREIGN PATENT DOCUMENTS

CN 1399819 2/2003
JP 2007-510390 4/2007

OTHER PUBLICATIONS

Samsung: "DCI Payload Formats and Contents," R1-081216, 3GPP TSG RAN WG1 #52bis, Mar. 31, 2008.
(Continued)

*Primary Examiner* — Kiet Tang
(74) *Attorney, Agent, or Firm* — The Farrell Law Firm, P.C.

(57) ABSTRACT

Methods and apparatuses are provided for controlling reference signal (RS) transmission between a user equipment (UE) and a base station in a wireless communication system. A method includes transmitting, to the UE, downlink control information (DCI) including RS request information. The RS request information includes one or two binary elements based on a DCI format. If an RS transmission triggered by the RS request information is to occur in a same subframe as another RS transmission previously configured to the UE from the base station, the UE transmits the RS triggered by the RS request information.

12 Claims, 9 Drawing Sheets

Related U.S. Application Data continuation of application No. 12/568,351, filed on Sep. 28, 2009, now Pat. No. 8,565,168.

(60) Provisional application No. 61/100,449, filed on Sep. 26, 2008.

(51) Int. Cl.
    *H04W 72/04* (2009.01)
    *H04L 27/26* (2006.01)
    *H04L 5/00* (2006.01)

(52) U.S. Cl.
    CPC ........ *H04L 5/0094* (2013.01); *H04L 27/2613* (2013.01); *H04L 5/0023* (2013.01); *H04L 5/0026* (2013.01)

(56) References Cited

U.S. PATENT DOCUMENTS

| | | |
|---|---|---|
| 2007/0086537 A1 | 4/2007 | Yoon et al. |
| 2008/0039098 A1 | 2/2008 | Papasakellariou et al. |
| 2008/0045260 A1 | 2/2008 | Muharemovic et al. |
| 2009/0181687 A1 | 7/2009 | Tiirola et al. |
| 2009/0257408 A1 | 10/2009 | Zhang et al. |
| 2009/0300456 A1 | 12/2009 | Pelletier et al. |
| 2009/0305706 A1 | 12/2009 | Tomizu et al. |
| 2010/0103902 A1 | 4/2010 | Kim et al. |
| 2010/0272038 A1* | 10/2010 | Hamalainen .......... H04W 16/14 370/329 |
| 2011/0083066 A1* | 4/2011 | Chung .................. H03M 13/09 714/807 |
| 2011/0134849 A1 | 6/2011 | Lee et al. |

OTHER PUBLICATIONS

Motorola et al.: "Way Forward on Indication of UE Antenna Selection for PUSCH," R1-081928, 3GPP TSG RAN WG1 #53, May 5, 2008.

3GPP TS 36.213 V8.4.0, "Evolved Universal Terrestrial Radio Access (E-UTRA): Physical Layer Procedures," Sep. 2008.

Motorola, "PDCCH: Scheduling Grant Field (DCI Format 0 and 1A) Definition", R1-080437, 3GPP TSG RAN1 #51bis, Jan. 18, 2008.

Motorola, "Open Issues on PDCCH Formats and Contents", R1-081287, 3GPP TSG RAN1 #52bis, Apr. 14, 2008.

Samsung, "Summary of Reflector Discussions on EUTRA UL RS", R1-081209, 3GPP TSG RAN WG1 #52bis, Mar. 30, 2008.

Samsung, "SRS Transmission Issues for LTE-A", R1-090100, 3GPP TSG RAN WG1 #55bis, Jan. 7, 2009.

Ericsson, "Usage of DwPTS", R1-080347, TSG-RAN WG1 #51bis, Jan. 14-18, 2008.

* cited by examiner

US 9,655,097 B2

APPARATUS AND METHOD FOR SUPPORTING TRANSMISSION OF SOUNDING REFERENCE SIGNALS FROM MULTIPLE ANTENNAS

PRIORITY

The present application is a Continuation Application of U.S. application Ser. No. 14/026,654, which was filed in the U.S. Patent and Trademark Office on Sep. 13, 2013, and issued as U.S. Pat. No. 9,232,515 on Jan. 5, 2016, which is a Continuation Application of U.S. application Ser. No. 12/568,351, which was filed in the U.S. Patent and Trademark Office on ifs Sep. 28, 2009, and issued as U.S. Pat. No. 8,565,168 on Oct. 22, 2013, and claims priority under 35 U.S.C. §119(e) to U.S. Provisional Application No. 61/100,449, entitled "Transmission of Sounding Reference Signals", which was filed in the U.S. Patent and Trademark Office on Sep. 26, 2008, the entire content of each of which is incorporated herein by reference.

BACKGROUND OF THE INVENTION

1. Field of the Invention

The present invention relates generally to a wireless communication system and, more particularly, to the transmission of sounding reference signals from multiple transmitter antennas of a user equipment. The sounding reference signals are intended to provide, among other objectives, an estimate of the channel medium experienced by the signal from each transmitter antenna. The present invention is also directed to supporting the transmission of sounding reference signals in multiple distinct bandwidths of a communication system.

2. Description of the Art

In order for a communication system to function properly, several types of signals are supported by the communication system. In addition to data signals, which convey information content, control signals also need to be transmitted to enable proper processing of the data signals. Such signals are transmitted from User Equipments (UEs) to their serving Base Station (BS or Node B) in the UpLink (UL) of the communication system and from the serving Node B to the UEs in the DownLink (DL) of the communication system. Examples of control signals include positive or negative acknowledgement signals (ACK or NAK, respectively) that are transmitted by a UE in response to correct or incorrect data packet reception. Control signals also include Channel Quality Indication (CQI) signals, which are sent by a UE to the Node B to provide information about DL channel conditions that UE experiences. Reference Signals (RS), also known as pilots, are typically transmitted by each UE to either enable coherent demodulation for transmitted data or control signals at the Node B or, in the UL, to be used by the receiving Node B to measure UL channel conditions that the UE experiences. An RS that is used for demodulation of data or control signals is referred to as a Demodulation (DM) RS, while an RS that is used for sounding the UL channel medium, and which is typically wideband in nature, is referred to as a Sounding RS (SRS).

A UE, also commonly referred to as a terminal or a mobile station, may be fixed or mobile and may be a wireless device, a cellular phone, a personal computer device, etc. A Node B is generally a fixed station and may also be referred to as a Base Transceiver System (BTS), an access point, or some other terminology.

UEs transmit signals conveying data or control information through a Physical Uplink Shared CHannel (PUSCH) while, in the absence of PUSCH transmission, the UEs transmit control signals through a Physical Uplink Control CHannel (PUCCH). A UE receives signals conveying data information through a Physical Downlink Shared CHannel (PDSCH), while DL control signals are conveyed through a Physical Downlink Control CHannel (PDCCH).

The UEs are assumed to transmit data or control signals over a Transmission Time Interval (TTI) which may correspond to a sub-frame having a duration of 1 millisecond (msec), for example.

FIG. 1 illustrates a block diagram of a sub-frame structure 110 for PUSCH transmission. The sub-frame includes two slots. Each slot 120 includes seven symbols used for the transmission of data and/or control signals. Each symbol 130 further includes a Cyclic Prefix (CP) in order to mitigate interference due to channel propagation effects. Some symbols in each slot may be used for RS transmission 140 to provide channel estimation and to enable coherent demodulation of a received signal. It is also possible for the TTI to have only a single slot or to have more than one sub-frame. The transmission BandWidth (BW) is assumed to include frequency resource units, which are referred to herein as Resource Blocks (RBs). For example, each RB includes $N_{sc}^{RB}=12$ sub-carriers. UEs may be allocated one or more consecutive RBs 150 for PUSCH transmission and one RB for PUCCH transmission. The above values are for illustrative purposes only.

PUSCH transmission or PDSCH reception by a UE may be initiated by the reception of a corresponding Scheduling Assignment (SA) at the UE, which was transmitted by the Node B through a Downlink Control Information (DCI) format in the PDCCH. The DCI format may inform a UE about a data packet transmission by the Node B in the PDSCH (DL SA), or about a data packet transmission to the Node B (UL SA) in the PUSCH. The Node B is assumed to separately code and transmit each DCI format conveying a SA.

FIG. 2 illustrates a processing chain at the Node B for an SA transmission. The Medium Access Control (MAC) UE IDentity (UE ID), for the UE that the SA is intended for, masks the CRC of the SA codeword. This enables the reference UE to identify that the SA is intended for it. A CRC of (non-coded) SA bits 210 is computed at block 220 and then masked using an exclusive OR (XOR) operation 230 between CRC bits and a MAC UE ID 240. Specifically, XOR(0,0)=0, XOR(0,1)=1, XOR(1,0)=1, XOR(1,1)=0. The masked CRC is then appended to the SA bits in block 250, and channel coding, such as for example convolutional coding, is performed in block 260. In block 270 rate matching to the allocated PDCCH resources is performed, and interleaving and modulation are performed in block 280, before transmission of a respective control signal 290.

The UE receiver performs the reverse operations of the Node B transmitter to determine whether it has an SA. These operations are illustrated in FIG. 3. A received control signal 310 is demodulated and the resulting bits are de-interleaved in block 320. The Node B rate matching is restored in block 330, followed by decoding in block 340. SA bits 360 are then obtained after extracting CRC bits in block 350 which are then de-masked by applying an XOR operation 370 with a UE ID 380. Finally, the UE performs a CRC test in block 390. If the CRC test is passed, the UE considers the SA as valid and determines the parameters for signal reception (DL SA) or signal transmission (UL SA). If the CRC test is not passed, the UE disregards the presumed SA.

A UL SA DCI format is described with respect to Table 1. Table 1 provides information about at least some of the Information Elements (IEs) an UL SA DCI format typically contains. Additional IEs or a different number of bits for each indicative IE in Table 1 may apply. The order with which IEs appear in an UL SA DCI format is arbitrary.

TABLE 1

IEs of an UL SA DCI format for PUSCH Transmission.

| IE | Number of Bits | Comment |
|---|---|---|
| Resource Allocation | 11 | Assignment of Consecutive RBs (Total of 50 RBs) |
| TBS (MCS) | 5 | MCS Levels |
| NDI | 1 | New Data Indicator (synchronous UL HARQ) |
| TPC | 2 | Power control commands |
| Cyclic Shift Indicator | 3 | SDMA (maximum of 8 UEs) |
| Hopping Flag | 1 | Frequency Hopping (Yes/No) |
| CQI Request | 1 | Include CQI report (Yes/No) |
| CRC (UE ID) | 16 | UE ID masked in the CRC |
| TOTAL | 40 | |

The first IE provides RB allocation. The UL signal transmission method is assumed to be Single Carrier Frequency Division Multiple Access (SC-FDMA). With SC-FDMA, the signal transmission BW is contiguous. For an operating BW of $N_{RB}^{UL}$ RBs, the number of possible contiguous RB allocations to a UE is $1+2+\ldots+N_{RB}^{UL}=N_{RB}^{UL}(N_{RB}^{UL}+1)/2$ and can be signaled with $\lceil \log_2(N_{RB}^{UL}(N_{RB}^{UL}+1)/2) \rceil$ bits, where $\lceil\ \rceil$ denotes the ceiling operation which rounds a number to its next higher integer. Therefore, for $N_{RB}^{UL}=50$, the IE requires 11 bits. Regardless of the transmission method, the UL SA DCI format is assumed to contain an IE for resource allocation.

The second IE provides Modulation and Coding Scheme (MCS) or Transport Block Size (TBS). With 5 bits, a total of 32 MCS or TBS can be supported. For example, the modulation may be QPSK, QAM16, or QAM64 while the coding rate may take discrete values between, for example, 1/16 and 1. Using the resource allocation information, a UE can determine the TBS from the MCS, or the reverse. Some MCS IE values may be used in conjunction with the application of Hybrid Automatic Repeat reQuest (HARQ) as is subsequently described.

The third IE is a New Data Indicator (NDI). The NDI is set to 1 if a new transport block should be transmitted, and is set to 0 if the same transport block, as in a previous transmission, should be transmitted (synchronous UL HARQ is assumed in this example).

The fourth IE provides a Transmission Power Control (TPC) command for power adjustments to the transmitted PUSCH signal and SRS signal.

The fifth IE is a Cyclic Shift (CS) indicator enabling the use of a different CS for a Constant Amplitude Zero Auto-Correlation (CAZAC) sequence used for the DM RS transmission in the PUSCH. As is subsequently described, the use of a different CS by a different UEs can provide orthogonal multiplexing of the respective RS.

The sixth IE indicates whether the PUSCH transmission hops in frequency.

The seventh IE indicates whether a DL CQI report should be included in the PUSCH.

In order for the Node B to properly determine the RBs and MCS for PUSCH transmission from a UE, it requires a UL CQI estimate over at least a part of the operating BW. Typically, this UL CQI estimate is obtained by the UE transmitting an SRS over the scheduling BW. The SRS is transmitted in one or more UL sub-frame symbols, replacing transmission of data or control. In addition to providing a Signal-to-Interference and Noise Ratio (SINR) estimate over its transmission BW, the SRS can also serve for UL TPC and UL synchronization.

FIG. 4 shows an SRS transmission. The SRS transmission occurs in a last sub-frame symbol of every other sub-frame 460, 465, for a respective 4.3% SRS overhead. UE1 410 and UE2 420 multiplex their PUSCH transmissions in different parts of the operating BW during a first sub-frame 401, while UE2 420 and UE3 430 do so during a second sub-frame 402, and UE4 440 and UE5 450 do so during a third sub-frame 403. In some UL sub-frame symbols, UEs transmit DM RSs to enable the Node B receiver to perform coherent demodulation of the data or control signal transmitted in the remaining sub-frame symbols. For example, UE1, UE2, UE3, UE4, and UE5 transmit DM RS 415, 425, 435, 445, and 455, respectively. UEs with SRS transmission may or may not have PUSCH transmission in the same sub-frame and, if they co-exist in the same sub-frame, SRS and PUSCH transmissions may be located at different parts of the operating BW.

The RS (DM RS or SRS) is assumed to be constructed from CAZAC sequences. An example of such sequences is given by the following Equation (1):

$$c_k(n) = \exp\left[\frac{j2\pi k}{L}\left(n + n\frac{n+1}{2}\right)\right] \quad (1)$$

In Equation (1), L is a length of the CAZAC sequence, n is an index of a sequence element, $n=\{0, 1, 2 \ldots, L-1\}$, and k is a sequence index. For CAZAC sequences of prime length L, the number of sequences is L−1. Therefore, an entire family of sequences is defined as k ranges in $\{1, 2 \ldots, L-1\}$. However, the sequences for RS transmission need not be generated by strictly using the above expression. As 1 RB is assumed to include $N_{sc}^{RB}=12$ sub-carriers, the sequences used for RS transmission can be generated by either truncating a longer prime length (such as length 13) CAZAC sequence or by extending a shorter prime length (such as length 11) CAZAC sequence by repeating its first element(s) at the end (cyclic extension), although the resulting sequences do not strictly fulfill the definition of a CAZAC sequence. Alternatively, CAZAC sequences can be generated through a computer search for sequences satisfying the CAZAC properties.

FIG. 5 shows a transmitter structure for the DM RS or the SRS based on a CAZAC sequence. The frequency domain version of a CAZAC sequence may be obtained by applying a Discrete Fourier Transform (DFT) to its time domain version. By choosing non-consecutive sub-carriers, a comb spectrum can be obtained for either the DM RS or the SRS. A comb spectrum is useful for orthogonally multiplexing (through frequency division) overlapping SRS transmissions with unequal BWs. Such SRSs are constructed by CAZAC sequences of different lengths, which cannot be orthogonally multiplexed using different CS.

Referring to FIG. 5, a frequency domain CAZAC sequence 510 is generated, the sub-carriers in the assigned transmission BW are mapped in block 520 through control of transmission bandwidth in block 530, the Inverse Fast Fourier Transform (IFFT) is performed in block 540, the CS is applied in block 550, the CP is applied in block 560 and filtering is applied in time windowing block 570 to a transmitted signal 580. The UE applies no padding in sub-carriers in which the DM RS or the SRS is not transmitted, such as in sub-carriers used for signal transmission by another UE and in guard sub-carriers (not shown).

Additional transmitter circuitry such as a digital-to-analog converter, analog filters, amplifiers, and transmitter antennas, as they are known in the art, are not shown.

At the receiver, the inverse (complementary) transmitter functions are performed. This is conceptually illustrated in FIG. 6 where the reverse operations of those in FIG. 5 apply. In FIG. 6, an antenna receives a Radio-Frequency (RF) analog signal and after passing through further processing units (such as filters, amplifiers, frequency down-converters, and analog-to-digital converters) a resulting digital received signal 610 passes through a time windowing unit 620 and the CP is removed in block 630. Subsequently, the CS of the transmitted CAZAC-based sequence is restored in block 640, a Fast Fourier Transform (FFT) is applied in block 650, the selection of the transmitted sub-carriers is performed in block 665 through control of reception bandwidth in block 660, and correlation with a CAZAC-based sequence replica 680 is applied at multiplier 670. Finally, output 690 is obtained and can then be passed to a channel estimation unit, such as a time-frequency interpolator, or an UL CQI estimator.

Different CSs of a CAZAC sequence provide orthogonal sequences. Therefore, different CSs of a CAZAC sequence can be allocated to different UEs and achieve orthogonal multiplexing of the RS transmitted by these UEs in the same RBs. This principle is illustrated in FIG. 7. In order for multiple CAZAC sequences 710, 730, 750, and 770, generated respectively from multiple CSs 720, 740, 760, and 780, of the same root CAZAC sequence to be orthogonal, CS value Δ 790 should exceed the channel propagation delay spread D (including a time uncertainty error and filter spillover effects). If $T_S$ is the duration of one symbol, the number of CSs is equal to the mathematical floor of the ratio $T_S/D$.

The SRS transmission BW may depend on a UL SINR that the UE experiences. For UEs with low UL SINR, the Node B may assign a small SRS transmission BW in order to provide a relatively large ratio of transmitted SRS power per BW unit, thereby improving the quality of the UL CQI estimate obtained from the SRS. Conversely, for UEs with high UL SINR, the Node B may assign a large SRS transmission BW since good UL CQI estimation quality can be achieved from the SRS while obtaining this estimate over a large BW.

Several combinations for the SRS transmission BW may be supported as shown in Table 2, which corresponds to configurations adopted in 3GPP E-UTRA LTE. The Node B may signal a configuration c through a broadcast channel. For example, 3 bits can indicate one of the eight configurations. The Node B may then individually assign to each UE one of the possible SRS transmission BWs $m_{SRS,b}^c$ (in RBs) by indicating the value of b for configuration c. Therefore, the Node B can multiplex SRS transmissions from UEs in the BWs $m_{SRS,0}^c$, $m_{SRS,1}^c$, $m_{SRS,2}^c$ (b=0, b=1, b=2, and b=3, respectively in Table 2).

TABLE 2

Example of $m_{SRS,b}^c$ RB values for UL BW of $N_{RB}^{UL}$ RBs with $80 < N_{RB}^{UL} \leq 110$.

| SRS BW configuration | b = 0 | b = 1 | b = 2 | b = 3 |
| --- | --- | --- | --- | --- |
| c = 0 | 96 | 48 | 24 | 4 |
| c = 1 | 96 | 32 | 16 | 4 |
| c = 2 | 80 | 40 | 20 | 4 |
| c = 3 | 72 | 24 | 12 | 4 |

TABLE 2-continued

Example of $m_{SRS,b}^c$ RB values for UL BW of $N_{RB}^{UL}$ RBs with $80 < N_{RB}^{UL} \leq 110$.

| SRS BW configuration | b = 0 | b = 1 | b = 2 | b = 3 |
| --- | --- | --- | --- | --- |
| c = 4 | 64 | 32 | 16 | 4 |
| c = 5 | 60 | 20 | Not Applicable | 4 |
| c = 6 | 48 | 24 | 12 | 4 |
| c = 7 | 48 | 16 | 8 | 4 |

Variation in the maximum SRS BW is primarily intended to accommodate a varying PUCCH size. The PUCCH is assumed to be transmitted at the two edges of the operating BW and to not be overlapped (interfered) with the SRS. Therefore, the larger the PUCCH size (in RBs), the smaller the maximum SRS transmission BW.

FIG. 8 further illustrates the concept of multiple SRS transmission BWs for configuration c=3 from Table 2. The PUCCH is located at two edges, 802 and 804, of the operating BW and a UE is configured SRS transmission BWs with either $m_{SRS}^3$=72 RBs 812, or $m_{SRS,1}^3$=24 RBs 814, or $m_{SRS,2}^3$=12 RBs 816, or $m_{SRS}^3$=4 RBs 818. A few RBs, 806 and 808, may not be sounded, but this usually does not affect the ability of the Node B to schedule PUSCH transmissions in those RBs, since the respective UL SINR may be interpolated from nearby RBs with SRS transmission. For SRS BWs other than the maximum, the Node B also assigns to a UE a starting frequency position of the SRS transmission.

The SRS transmission parameters are assumed to be configured for each UE by the Node B through higher layer signaling, for example, through the MAC layer or the Radio Resource Control (RRC) layer, and remain valid until reconfigured again through higher layer signaling. These SRS transmission parameters may include:

the SRS transmission BW;
the SRS starting BW position;
the SRS transmission comb (if the SRS has a comb spectrum);
the SRS CS;
the SRS transmission period (for example, one SRS transmission every 5 sub-frames);
the starting sub-frame of SRS transmission (for example, the first sub-frame in a set of 1000 sub-frames); and
whether SRS hopping is enabled (SRS transmission hops in the operating BW or not).

The configuration of the SRS transmission parameters for each UE should be such that UL throughput gains are maximized while the SRS overhead is minimized. For example, a short SRS transmission period may only result in increased UL overhead if the channel remains highly correlated between two successive SRS transmissions. Conversely, a long SRS transmission period may not provide the Node B with the proper UL CQI in sub-frames between two SRS transmissions for which the channel may become highly uncorrelated.

Enabling high UL data rates and high UL spectral efficiencies requires the use of multiple UE transmitter antennas and the application of Single-User Multiple-Input Multiple-Output (SU-MIMO) methods. To obtain the potential benefits from SU-MIMO, the Node B scheduler should be provided with a channel estimate from each UE transmitter antenna. Therefore, an SRS transmission from each UE transmitter antenna is required. Moreover, since the use of SU-MIMO is often associated with a relatively high UL SINR, the SRS transmission BW from each UE transmitter antenna may be large. This reduces the SRS multiplexing capacity and results in increased UL overhead. Considering that a UE may have as many as four or even eight transmitter antennas, the UL overhead required to support SRS transmissions may become too large and offset a significant part of the SU-MIMO spectral efficiency gains.

Configuring the SRS transmission parameters to remain constant over a long time period may often result in under-utilization of the respective overhead. When the UE has no data to transmit, and hence is not scheduled by the Node B, relatively frequent SRS transmissions are wasteful. When the UE has a large amount of data to transmit, and hence it often needs PUSCH scheduling, frequent SRS transmissions are required. However, this is not possible with a semi-static configuration of the SRS transmission parameters through higher layer (MAC or RRC) signaling without incurring prohibitive SRS overhead. Such conditions typically occur for services associated with traffic bursts, such as, for example, file uploading or web browsing. Fast activation of SRS transmissions and fast configuration of the SRS transmission parameters enabled through dynamic physical layer control signaling are beneficial to address such traffic models while maintaining low SRS overhead.

A dynamically configured function is one enabled through physical layer control signaling, such as for example through a DCI format, while a semi-statically configured function is one enabled through higher layer (MAC or RRC) signaling. Physical layer signaling allows for fast UE response in the order of a sub-frame period. Higher layer signaling results in slower UE response in the order of several sub-frame periods.

For a communication system having multiple UL Component Carriers (CCs), SRS transmission from a UE is assumed to be configured (through higher layer signaling) only in those UL CCs with a respective PUSCH transmission. In such cases, it is beneficial to also enable the Node B to perform, dynamic or semi-static, activation and configuration of SRS transmissions in new UL CCs where the UE is not configured PUSCH or SRS transmission. This allows the Node B to obtain information for the interference and channel conditions the UE will experience in the new UL CCs. Based on this information, the Node B may subsequently decide to also schedule PUSCH transmissions from the UE in the new UL CCs, replace an existing UL CC with a new UL CC (discontinue scheduling in an existing UL CC and begin scheduling in the new UL CC), or make no change to the existing configuration of UL CCs.

SUMMARY OF THE INVENTION

The present invention has been made to address at least the above problems and/or disadvantages and to provide at least the advantages described below.

Accordingly, an aspect of the present invention provides methods and apparatus for dynamic activation of Sounding Reference Signal (SRS) transmissions from User Equipments (UEs) in the UpLink (UL) of a communication system, for dynamic configuration of the SRS transmission parameters, for activation and configuration of SRS transmissions in component carriers not having configured SRS transmission from a reference UE, and for configuration of SRS transmission parameters from multiple UE transmitter antennas.

According to an aspect of the present invention, a method is provided for controlling reference signal (RS) transmission of a user equipment (UE) by a base station in a wireless communication system. The method includes transmitting, to the UE, downlink control information (DCI) including RS request information. The RS request information includes one or two binary elements based on a DCI format. If an RS transmission triggered by the RS request information is to occur in a same subframe as another RS transmission previously configured to the UE from the base station, the UE transmits the RS triggered by the RS request information.

According to another aspect of the present invention, a method is provided for controlling reference signal (RS) transmission by a user equipment (UE) in a wireless communication system. The method includes receiving, from a base station, downlink control information (DCI) including RS request information. The RS request information includes one or two binary elements based on a DCI format. If an RS transmission triggered by the RS request information is to occur in a same subframe as another RS transmission previously configured to the UE from the base station, the UE transmits the RS triggered by the RS request information.

According to another aspect of the present invention, a base station is provided for use in a wireless communication system. The base station includes a transceiver for transmitting, to a user equipment (UE), downlink control information (DCI) including reference signal (RS) request information. The RS request information includes one or two binary elements based on a DCI format. If an RS transmission triggered by the RS request information is to occur in a same subframe as another RS transmission previously configured to the UE from the base station, the UE transmits the RS triggered by the RS request information.

According to another aspect of the present invention, a user equipment (UE) is provided for use in a wireless communication system. The UE includes a transceiver for receiving, from a base station, downlink control information (DCI) including reference signal (RS) request information. The RS request information includes one or two binary elements based on a DCI format. If an RS transmission triggered by the RS request information is to occur in a same subframe as another RS transmission previously configured to the UE from the base station, the UE transmits the RS triggered by the RS request information.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
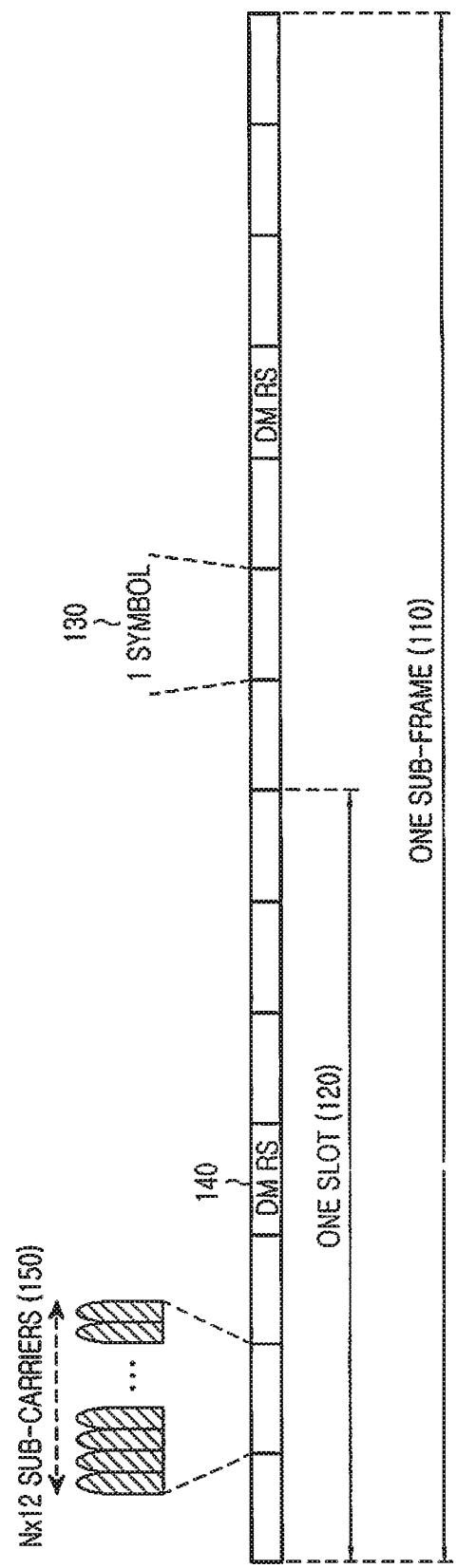
FIG. 1 is a diagram illustrating a UL sub-frame structure for PUSCH transmission in the UL of the communication system.
Figure 2:
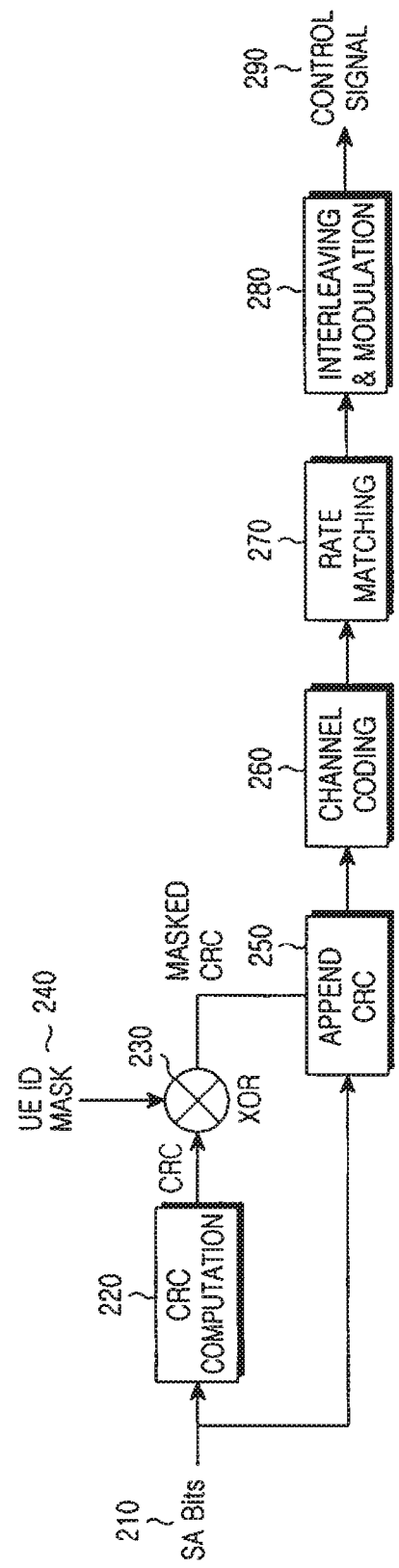
FIG. 2 is a block diagram illustrating the coding process of an SA at the Node B.
Figure 3:
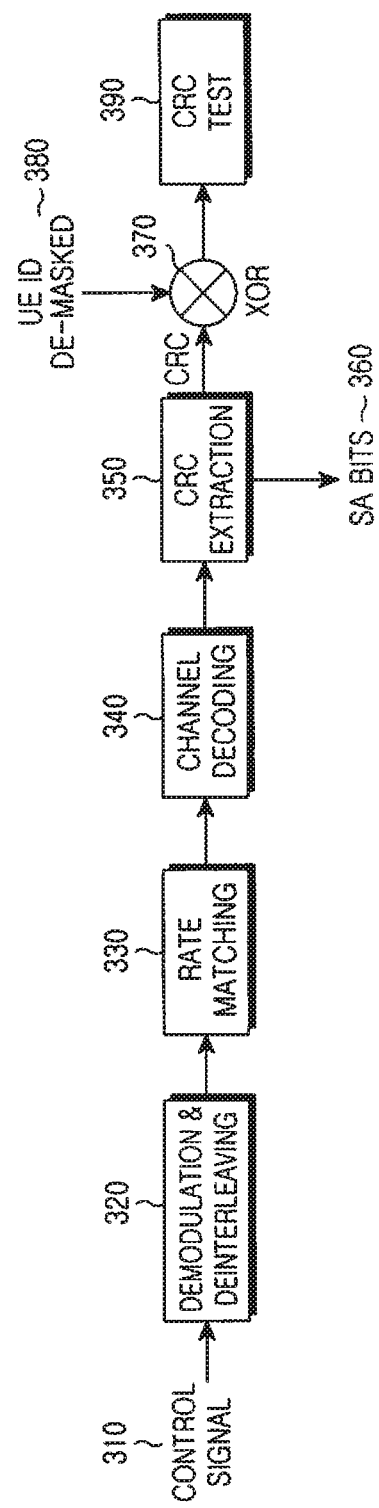
FIG. 3 is a block diagram illustrating the decoding process of an SA at the UE.
Figure 4:
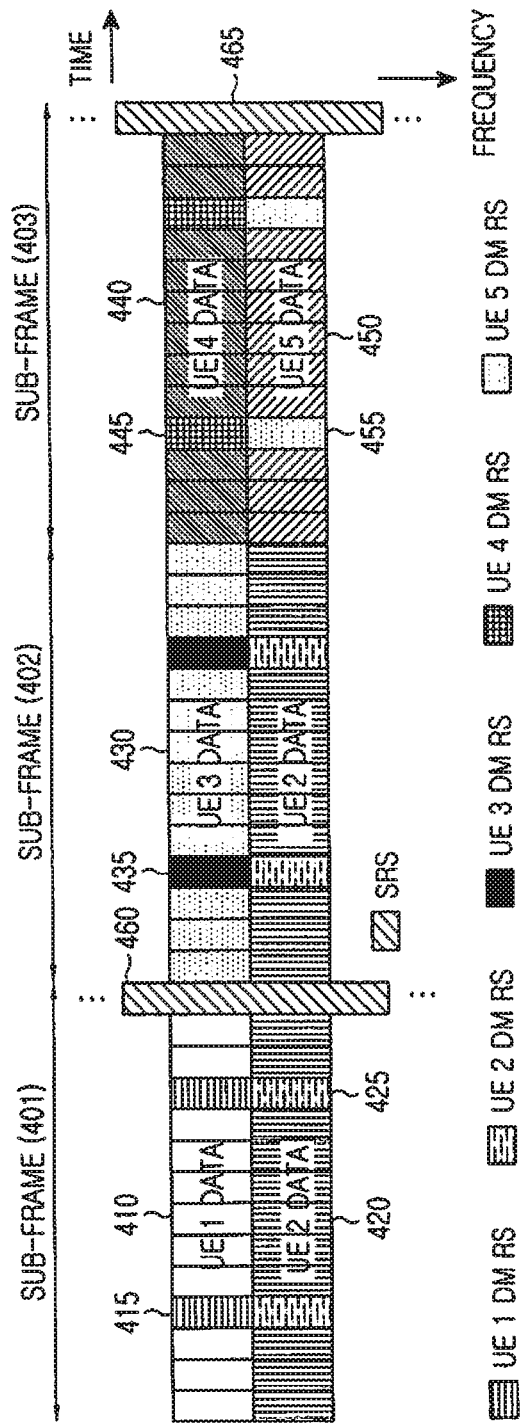
FIG. 4 is a diagram illustrating an SRS multiplexing method in the UL sub-frame structure.
Figure 5:
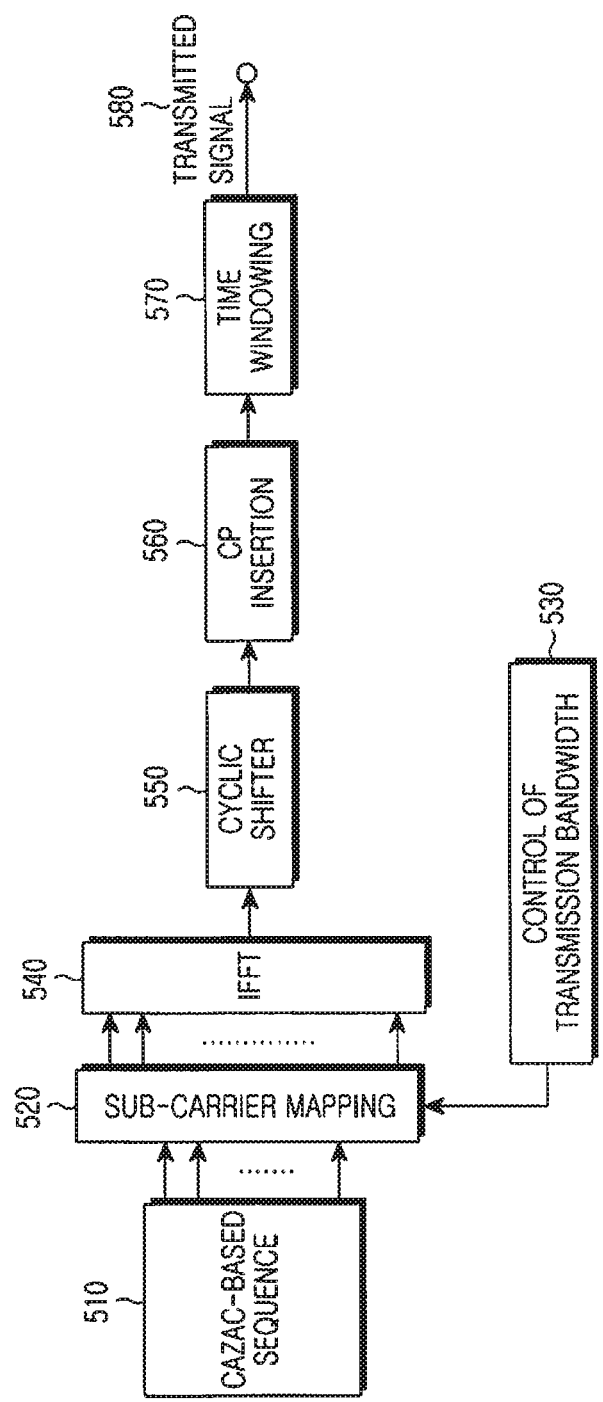
FIG. 5 is a block diagram illustrating an RS transmitter structure.
Figure 6:
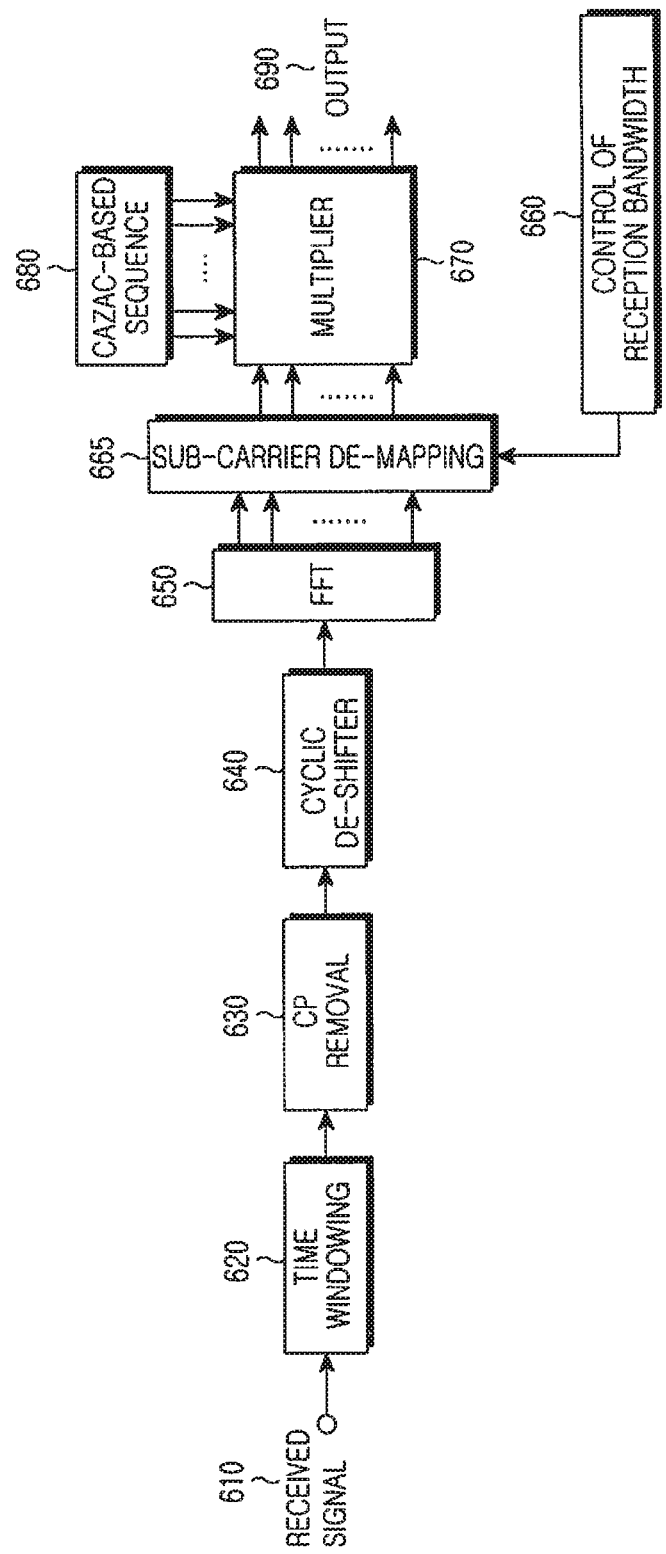
FIG. 6 is a block diagram illustrating an RS receiver structure.
Figure 7:
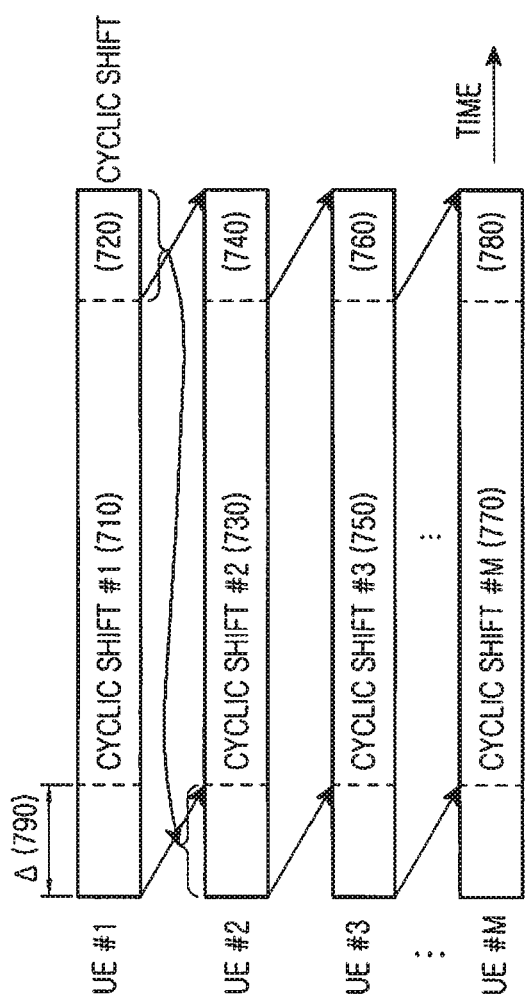
FIG. 7 is a diagram illustrating orthogonal RS multiplexing using different cyclic shifts of a CAZAC sequence.
Figure 8:
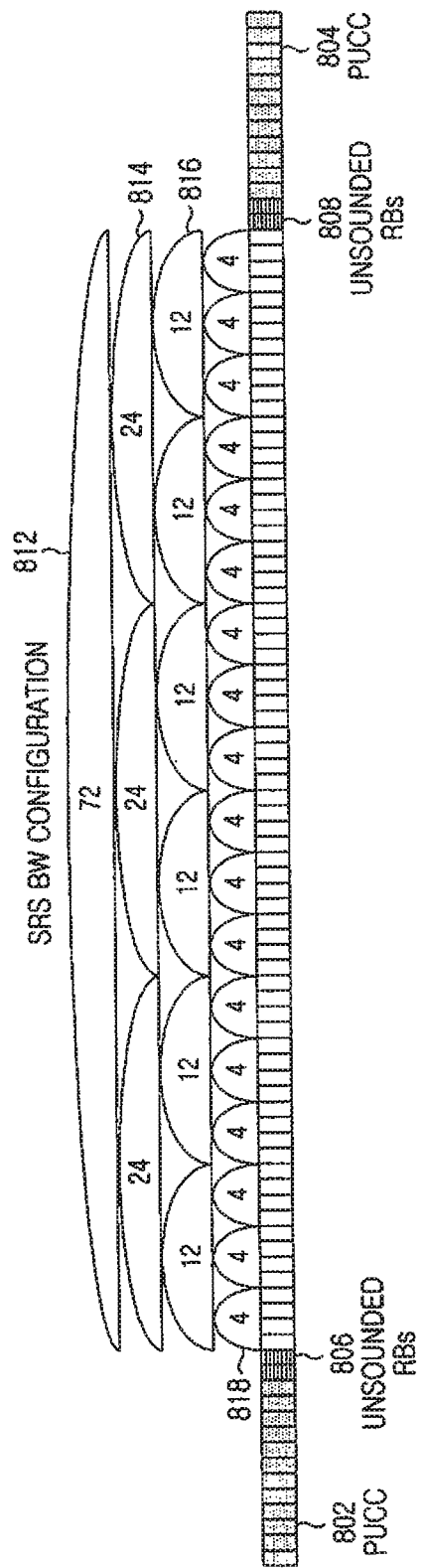
FIG. 8 is a diagram illustrating a configuration for multiplexing SRS transmissions in various bandwidths.

Embodiments of the present invention are described in detail with reference to the accompanying drawings. The same or similar components may be designated by the same or similar reference numerals although are illustrated in different drawings. Detailed descriptions of constructions or processes known in the art may be omitted to avoid obscuring the subject matter of the present invention.

Although the present invention is described in relation to an Orthogonal Frequency Division Multiple Access (OFDMA) communication system, it may also apply to all Frequency Division Multiplexing (FDM) systems in general and to Single-Carrier Frequency Division Multiple Access (SC-FDMA), Orthogonal Frequency Division Multiplexing (OFDM), Frequency Division Multiple Access (FDMA), Discrete Fourier Transform (DFT)-spread OFDM, DFT-spread OFDMA, Single-Carrier-OFDMA (SC-OFDMA), and Single-Carrier-OFDM (SC-OFDM), in particular.

The embodiments of the present invention relate to dynamic activation and deactivation of SRS transmissions in a UL CC with configured SRS transmissions for a reference UE, dynamic configuration of SRS transmission parameters, dynamic or semi-static activation and configuration of SRS transmissions in a UL CC without configured SRS transmissions, and dynamic configuration of SRS transmission parameters from multiple UE antennas.

The dynamic activation and deactivation of SRS transmissions uses at least one UL SA DCI format from the UL SA DCI formats a UE decodes. The activated SRS transmission may occur either once or indefinitely until disabled.

The dynamic configuration of the SRS transmission parameters, such as, for example, the period, the BW, the comb, and the CS, may occur either once or indefinitely until disabled.

A first method to activate or deactivate SRS transmissions using a UL SA DCI format includes a 1-bit "SRS Activation" IE. The UE, upon reception of the UL SA DCI format, examines the value of the "SRS Activation" IE. For example, "SRS Activation"=0 may indicate deactivation of an existing SRS transmission or to maintain the absence of SRS transmissions. "SRS Activation"=1 may indicate activation of SRS transmissions or maintain an existing SRS transmission using previously assigned parameters through higher layer signaling. Activated SRS transmissions may occur once or indefinitely until disabled. Activated SRS transmissions occurring once can be in a UL CC without configured SRS transmissions.

If the UE has more than one transmitter antenna, SRS activation may apply to only a subset of these antennas. A first method for indicating activation of multiple antenna subsets is through explicit signaling. The number of bits in the "SRS Activation" IE should be such that they can address all possible antenna subsets. For example, for a UE with two or four transmitter antennas, a 2-bit "SRS Activation" IE can be interpreted by the UE as in Table 3. The same principle can be extended to a larger number of UE transmitter antennas.

TABLE 3

Explicit SRS Activation.

| SRS Activation IE | UE Action (2 Transmitter Antennas) | UE Action (4 Transmitter Antennas) |
| --- | --- | --- |
| 00 | No SRS Activation | No SRS Activation |
| 01 | SRS Activation for Antenna 1 | SRS Activation for Antennas 1 and 2 |
| 10 | SRS Activation for Antenna 2 | SRS Activation for Antennas 3 and 4 |
| 11 | SRS Activation for all Antennas | SRS Activation for all Antennas |

Figure 9:
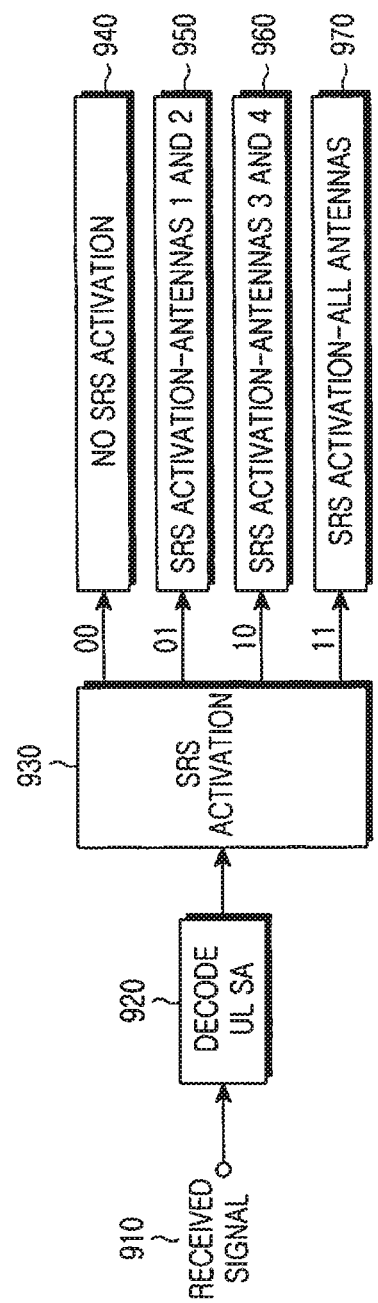
FIG. 9 is a diagram illustrating a UE decision process for SRS activation based on an UL SA DCI format, according to an embodiment of the present invention.

The UE action is illustrated in FIG. 9, assuming that there are 4 UE transmitter antennas. The UE, upon the signal reception 910, decodes the UL SA DCI format in block 920, and examines the value of the "SRS Activation" IE in block 930. If the value is 00, the SRS is not activated (or an active SRS is deactivated) as shown in block 940. If the value is 01, the UE begins SRS transmission, using previously configured parameters, from antenna 1 and antenna 2, as shown in block 950. If the value is 10, the UE begins SRS transmission, using previously configured parameters, from antenna 3 and antenna 4, as shown in block 960. If the value is 11, the UE begins SRS transmission, using previously configured parameters, from all four antennas, as shown in block 970.

A second method to activate or deactivate SRS transmissions from multiple UE transmitter antenna subsets through a UL SA DCI format utilizes combinations of explicit and implicit signaling. The 1-bit "SRS Activation" IE can be combined with another IE under some restrictions in the addressable range of the latter IE. For example, when combining the "SRS Activation" IE with the "CQI Request" IE, their combination can be interpreted as shown in Table 4. The restriction is that positive CQI requests and SRS activation cannot occur simultaneously with the same UL SA DCI format and independent activation of the subset of {antenna 3, antenna 4}, in case of 4 UE transmitter antennas, is also not possible. Nevertheless, the most significant configurations, as well as the case of 2 UE transmitter antennas, can be addressed while reducing the number of bits required in the UL SA DCI format by one, relative to full explicit signaling.

TABLE 4

Combining Interpretation of CQI Request IE and SRS Activation IE.

| CQI Request IE SRS Activation IE | UE Action (2 Transmitter Antennas) | UE Action (4 Transmitter Antennas) |
| --- | --- | --- |
| 00 | No CQI Request - No SRS Activation | No CQI Request - No SRS Activation |
| 01 | No CQI Request - SRS Activation for Antenna 1 | No CQI Request - SRS Activation for Antennas 1 and 2 |
| 10 | CQI Request - No SRS Activation | CQI Request - No SRS Activation |
| 11 | No CQI Request - SRS Activation for all Antennas | No CQI Request - SRS Activation for all Antennas |

Another combination of explicit and implicit signaling for SRS activation utilizes the $I_{MCS}$ values of the MCS IE. Incremental Redundancy (IR) with four Redundancy Versions (RVs), RV0, RV1, RV2, and RV3, is assumed to apply for the HARQ process. To maximize separation of the RVs, and therefore maximize the respective coding gain for each HARQ transmission, the order of the RVs may be {RV0, RV2, RV3, RV1}, with RV0 corresponding to an initial packet transmission. Then, for synchronous UL HARQ, the last 3 values of the 5-bit MCS IE may indicate one of the 3 RVs for a retransmission with the MCS being determined from the most recent PDCCH for the same transport block. Therefore, $0 \leq I_{MCS} \leq 28$ indicates a valid MCS for a new packet transmission while, for retransmissions, RV2, RV3, and RV1 are respectively indicated by $I_{MCS}=29$, $I_{MCS}=30$, and $I_{MCS}=31$. Since RV1 and RV3 are used least frequently for retransmissions, they can be combined with the "SRS Activation" IE, whenever the latter indicates SRS transmission, to address antenna subsets as in the arrangement shown in Table 5. The inability to use RV1 or RV3 whenever "SRS Activation"=1 results in negligible loss in system throughput.

TABLE 5

Combining Interpretation of MCS IE and SRS Activation IE.

| MCS IE $I_{MCS}$ | SRS Activation IE | UE Action (2 Transmitter Antennas) | UE Action (4 Transmitter Antennas) |
|---|---|---|---|
| Any | 0 | No SRS Activation | No SRS Activation |
| Any | 1 | SRS Activation for Antenna 1 | SRS Activation for Antennas 1 and 2 |
| 31 | 1 | SRS Activation for all Antennas | SRS Activation for all Antennas |
| 30 | 1 | SRS Activation for Antenna 2 | SRS Activation for Antennas 3 and 4 |

Modifications to the embodiments in Table 3, Table 4, and Table 5 can be applied. For example, for two UE transmitter antennas in Table 5, the MCS entry $I_{MCS}=30$ may not be used at all. Instead SRS activation for transmitter antenna 1 may always apply whenever SRS transmission is enabled. Moreover, in all previous cases, SRS transmission can be disabled through the UL SA DCI format by having "SRS Activation"=0.

For a UE with multiple transmitter antennas, it is also possible for the SRS transmission to begin without explicit activation once the SRS transmission parameters are configured through higher layer (MAC or RRC) signaling. However, SRS transmission from only one antenna at each SRS transmission instance is assumed in this case, thereby possibly alternating among antennas in successive SRS transmission instances. For example, antenna 1 may be used in a first SRS transmission instance, antenna 2 may be used in the next SRS transmission instance, and so on. Activation of SRS transmissions from antenna subsets occurs as described above. Table 6 shows the explicit SRS activation from multiple antennas using a 1-bit "SRS Activation" IE. Table 7 shows an example of explicit and implicit SRS activation from multiple antennas using a 1-bit "SRS Activation" IE.

TABLE 6

Explicit SRS Activation for Multiple Antennas (Initial Transmission from 1 Antenna).

| SRS Activation IE | UE Action (2 Transmitter Antennas) | UE Action (4 Transmitter Antennas) |
|---|---|---|
| 0 | No further SRS Activation | No further SRS Activation |
| 1 | SRS Activation for all Antennas | SRS Activation for all Antennas |

TABLE 7

Combining MCS IE and SRS Activation IE (Initial SRS Transmission from 1 Antenna).

| MCS IE $I_{MCS}$ | SRS Activation IE | UE Action (4 Transmitter Antennas) |
|---|---|---|
| Any | 0 | No SRS Activation |
| Any | 1 | SRS Activation for Antennas 1 and 2 |
| 31 | 1 | SRS Activation for all Antennas |

The UE action when there is a combination of explicit and implicit signaling, or when implicit signaling is used for SRS activation, can be derived in a straightforward manner from that described with respect to FIG. 9.

Dynamic configuration of SRS transmission parameters in a UL CC with already configured SRS transmissions or in a UL CC without configured SRS transmissions utilizes at least one of the possibly multiple UL SA DCI formats a reference UE is assumed to decode. For a UL CC with a configured SRS transmission, the dynamic configuration of the SRS transmission parameters overrides the previously configured SRS transmission parameters. For a UL CC without a configured SRS transmission, the dynamic configuration of the SRS transmission parameters also serves as an activation of the SRS transmission.

When configuring the SRS transmission parameters, the UL SA DCI format is not interpreted as scheduling a packet transmission, but rather as configuring an SRS transmission. This configuration can be performed either explicitly, using an "SRS Activation" IE, or implicitly, using certain values in existing IEs. For example, with respect to an implicit indication, the UL SA DCI format may be interpreted as configuring an SRS transmission if the "CQI Request" IE equals 1 and the "MCS" IE $I_{MCS}$ equals 30 or 31. With respect to an explicit indication, the UL SA DCI format may be interpreted as configuring an SRS transmission if the "SRS Activation" IE equals 1; otherwise, if the "SRS Activation" IE equals 0, the SRS transmission remains as previously configured by higher layer (MAC or RRC) signaling. Considering the UL SA DCI format in Table 1 and the inclusion of an "SRS Activation" IE (this IE is not needed with implicit configuration of the SRS transmission parameters), the UL SA DCI format contents may be interpreted as shown in Table 8.

TABLE 8

IEs for Configuring SRS Transmission through an UL SA DCI Format.

| Information IE | Number of Bits | Comment |
|---|---|---|
| SRS Activation | 1 | UL SA activates SRS transmission (Yes/No) |
| SRS Transmission BW | $2 \times N_{ant}$ | Four SRS BWs per operating BW |
| SRS Starting BW | $5 \times N_{ant}$ | Starting SRS BW Position |
| SRS Transmission Comb | $1 \times N_{ant}$ | Two combs |
| SRS Cyclic Shift | $3 \times N_{ant}$ | Eight cyclic shifts |
| SRS Transmission Period | $3 \times N_{ant}$ | Transmission periodicity (in sub-frames) |
| SRS Starting Sub-frame | $8 \times N_{ant}$ | Starting sub-frame (one of 256 sub-frames) |
| SRS Hopping | $1 \times N_{ant}$ | SRS BW Hopping |
| TPC Command | $2 \times N_{ant}$ | Transmission power control command |

TABLE 8-continued

IEs for Configuring SRS Transmission through an UL SA DCI Format.

| Information IE | Number of Bits | Comment |
| --- | --- | --- |
| UL Component Carrier | 2 × $N_{ant}$ | Maximum of 4 UL Component Carriers |
| CRC (UE ID) | 16 | UE ID masked in the CRC |
| TOTAL | 17 + 27 × $N_{ant}$ | |

The "SRS Activation" IE and the CRC field do not depend on the number of UE transmitter antennas. The remaining IEs may apply per UE transmitter antenna to provide full flexibility. However, for more than one UE transmitter antenna, the total size of the UL SA DCI format configuring SRS transmissions may become larger than the one for scheduling data packet transmissions. Additionally, flexibility to configure independent SRS transmission parameters for each antenna is usually not needed. To avoid increasing the UL SA DCI format size for configuring SRS transmissions as the number of UE transmitter antennas increases, embodiments of the present invention consider several restrictions and simplifications.

For SRS transmission from multiple UE antennas, the same BW for all antennas can be used. Therefore, embodiments of the present invention consider that the SRS transmission BW, the SRS starting BW location, the SRS hopping activation, and the UL CC of SRS transmission are specified for one UE transmitter antenna and are the same for the remaining UE transmitter antennas.

Alternatively, these SRS transmission parameters may be derived according to a predetermined rule relative to those specified through the UL SA DCI format for the reference transmitter antenna. For example, to support transmission antenna diversity when the transmissions from two UE antennas are correlated, the starting SRS transmission BW for the second antenna may be that which is furthest from the starting SRS transmission BW for the first antenna. Regardless of the exact relationship between the previous SRS parameters for the UE transmitter antennas, embodiments of the present invention consider that they are only signaled for one UE transmitter antenna.

Other SRS transmission parameters that may be common among all UE transmitter antennas are the SRS transmission period and the SRS starting transmission sub-frame. This is due to the fact that it is beneficial for the Node B scheduler to be provided with a UL CQI estimate for each UE transmitter antenna at the same time. Otherwise, the UL CQI reliability may be different among antennas as the UL channel varies with time, which may degrade the UL spectral efficiency. Additionally, a reduced range for the configuration of these parameters, relative to those already configured through higher layer (MAC or RRC) signaling, may apply. For example, higher layer signaling configures the SRS starting transmission sub-frame using 8 bits, but the adjustment with the subsequent configuration is with 4 bits to inform 1 of 16 possible predetermined sub-frame locations relative to the previous configured sub-frame.

The previous restrictions in the SRS transmission parameters from multiple UE transmitter antennas may also apply if higher layer (MAC or RRC) signaling is used to configure these parameters and SRS activation is either immediate upon configuration or is enabled subsequently through a UL SA DCI format. Higher layer (MAC or RRC) signaling may only specify the SRS transmission parameters for one reference UE transmitter antenna and the SRS transmission parameters for the remaining UE transmitter antennas may be the same or derived in a predetermined manner from those for the reference UE transmitter antenna.

Regarding the SRS CS and SRS transmission comb, it may often be beneficial to allow their specification through respective IEs in the UL SA DCI format configuring the SRS transmission. This is due to the fact that SRS transmissions from other UEs may already exist in the same BW and the same sub-frame when SRS transmissions from the reference UE need to be configured. SRS collisions may be avoided by assigning a different CS or comb to the SRS transmissions from the reference UE. This option is possible when the number of bits in the UL SA DCI format configuring the SRS transmission parameters is adequately large.

Regarding the SRS TPC command, different UE transmitter antennas may experience different shadowing conditions leading to the requirement for different adjustments of the respective transmission power. However, as the different shadowing conditions among UE transmitter antennas remain constant over much longer periods than the sub-frame period, the respective power control adjustments can be made through higher layers (MAC or RRC) and only a single TPC command applicable to all UE transmitter antennas may be included in the DCI format configuring the SRS transmission parameters.

When the number of bits in the UL SA DCI format configuring the SRS transmission parameters is not adequately large, only the CS and the comb for the SRS transmission from the first antenna may be explicitly signaled, while the respective parameters for the remaining antennas are implicitly derived from those for the first antenna. For example, for a UE with 2 transmitter antennas, if a first CS value, from a set of possible CS values, is explicitly signaled for the SRS transmission from the first antenna, the CS value for the SRS transmission from the second antenna can be the same as the CS value for the SRS transmission from the first antenna when a different comb is used, can be the next CS value from the set of CS values, or can be the CS value, from the set of CS values, that is separated the most from the signaled CS value. Similarly, the comb for the SRS transmission from the second antenna can be the same as the comb for the SRS transmission from the first antenna when different CS values are used or, assuming two possible comb values, if the SRS transmission from the first antenna uses the first comb value the SRS transmission from the second antenna uses the second comb value.

Based on the previous restrictions and simplifications, the UL SA DCI format content for the configuration of the SRS transmission parameters may be interpreted as shown in Table 9 with respect to one of the UE transmitter antennas.

TABLE 9

Configuring SRS Transmission through an UL SA DCI Format.

| SRS Information IE | Number of Bits | Comment |
| --- | --- | --- |
| SRS Activation | 1 | Interpretation of UL DCI format |
| SRS Transmission BW | 2 | Four SRS BWs per operating BW |
| SRS Starting BW | 5 | Starting BW Position (3 bits are enough for 5 MHz) |
| SRS Transmission Comb | 1 | Two combs |
| SRS Cyclic Shift | 3 | Eight cyclic shifts |
| SRS Transmission Period | 3 or less | For reduced range, value is relative to previous one |
| SRS Starting Sub-Frame | 8 or less | For reduced range, value is relative to previous one |

TABLE 9-continued

Configuring SRS Transmission through an UL SA DCI Format.

| SRS Information IE | Number of Bits | Comment |
|---|---|---|
| SRS Hopping | 1 | Hopping On/Off |
| SRS TPC Command | 2 | Transmission power control command |
| UL Component Carrier | 2 | Indicate 1 of 4 (pre-configured) UL CCs |
| CRC (UE ID) | 16 | UE ID masked in the CRC |
| TOTAL | 44 or less | |

If the SRS CS and SRS comb are explicitly signaled for all UE transmitter antennas, the UL SA DCI format content for the configuration of the SRS transmission parameters may be interpreted as shown in Table 10 with respect to one of the UE transmitter antennas.

TABLE 10

Configuring SRS Transmission through an UL SA DCI Format.
SRS CS and SRS Comb are Explicitly Signaled for each UE Transmitter Antenna.

| SRS Information IE | Number of Bits | Comment |
|---|---|---|
| SRS Activation | 1 | Interpretation of UL DCI format |
| SRS Transmission BW | 2 | Four SRS BWs per operating BW |
| SRS Starting BW | 5 | Starting BW Position (3 bits are enough for 5 MHz) |
| SRS Transmission Comb | $1 \times N_{ant}$ | Two combs |
| SRS Cyclic Shift | $3 \times N_{ant}$ | Eight cyclic shifts |
| Sub-Frame Offset | 8 or less | For reduced range, value is relative to previous one |
| SRS Transmission Period | 3 or less | For reduced range, value is relative to previous one |
| SRS Hopping | 1 | Hopping On/Off |
| SRS TPC Command | 2 | Transmission power control command |
| UL Component Carrier | 2 | Indicate 1 of 4 (pre-configured) UL CCs |
| CRC (UE ID) | 16 | UE ID masked in the CRC |
| TOTAL | $\leq 38 + 4 \times N_{ant}$ | |

The UE may choose the transmitter antenna for which the SRS transmission parameters are specified, and the Node B may not have knowledge of the UE transmitter antenna for which it specifies the SRS transmission parameters. Moreover, although the previous implicit configuration of the SRS transmission parameters was described assuming physical layer control signaling (through a DCI format), the same principles apply for higher layer control signaling, such as MAC signaling or RRC signaling.

The configured SRS transmission may be in the same UL CC as an existing SRS transmission. In this case, configuration of the SRS transmission parameters may serve to more effectively utilize the available resources and minimize the associated SRS overhead. For example, the Node B can dynamically disable SRS hopping if good SINR is obtained in a particular part of the BW, or can dynamically enable SRS hopping when the opposite occurs. Also, the Node B can dynamically reassign SRS transmission resources that become available to other UEs in order to improve SRS multiplexing capacity and reduce the corresponding overhead, or can increase the SRS transmission BW as the UE SINR increases (and the reverse).

If the configured SRS transmission corresponds to a UL CC without an existing SRS transmission, the SRS transmission may be a single, "one-shot", transmission that serves to provide an estimate of the interference and channel conditions the reference UE may experience in the new UL CC. Based on this information, the serving Node B may then decide to transition the PUSCH transmission from the reference UE to the new UL CC to incorporate the new UL CC in those with configured PUSCH transmission, or to decide against configuring the new UL CC for PUSCH transmissions. The reference UE is assumed to know the numbering of the UL CCs, for example, through previous higher layer (MAC or RRC) signaling. The configuration of the SRS transmission parameters in a UL CC without an existing SRS transmission may also be semi-static through higher layer signaling. The previously described DCI format configuration of the SRS transmission parameters is again provided using higher layer signaling.

For the configuration of the SRS transmission parameters in a UL CC without an existing SRS transmission, not all IEs in Table 8, Table 9, or Table 10 need to be specified since there is no need to provide information about SRS activation, SRS hopping, and SRS transmission periodicity (single SRS transmission is assumed). For the SRS transmission sub-frame, no specification may apply when a fixed offset applies between the sub-frame of the DCI format transmission and the sub-frame of the SRS transmission. For example, the sub-frame of SRS transmission may immediately follow that of the UL SA DCI format reception. However, to provide some flexibility, a small number of bits, such as 3 bits, can be used to specify that the sub-frame may be specified relative to the first UL sub-frame after the UL SA DCI format reception. Also, transmission may be pre-configured to be only from a subset of the set of UE transmitter antennas, and not from all UE transmitter antennas.

Explicit indication of the CS and the comb may then apply by utilizing the unused IEs. The UE then interprets the bits corresponding to these IEs differently depending on whether the UL CC for which the SRS transmission parameters are configured already has an SRS transmission (the IEs convey their respective information), or not (the bits of those IEs can convey the CS or the comb for multiple transmitter antennas). Additionally, power control commands for the transmission of the SRS in the UL CC without an existing SRS transmission may be included in the DCI format. Table 11 summarizes the above reinterpretation aspects. In general, if the number of bits required for configuring the parameters for SRS transmission in a UL SA DCI format are fewer than the number of bits in that UL SA DCI format, each of the remaining bits can be set to a respective pre-determined value such as zero. The information in Table 11 may also be provided by higher layer (MAC or RRC) signaling.

TABLE 11

Configuring SRS Transmission in UL CC without Configured SRS Transmission.

| SRS Information IE | Number of Bits | Comment |
|---|---|---|
| SRS Transmission BW | 2 | Four SRS BWs per operating BW |
| SRS Starting BW | 5 | Starting BW Position (3 bits are enough for 5 MHz) |
| SRS Transmission Comb | $\leq 1 \times N_{ant}$ | Two combs (not all antennas may be used) |
| SRS Cyclic Shift | $\leq 3 \times N_{ant}$ | Eight cyclic shifts (not all antennas may be used) |

TABLE 11-continued

Configuring SRS Transmission in UL CC without Configured SRS Transmission.

| SRS Information IE | Number of Bits | Comment |
|---|---|---|
| Sub-Frame Offset | 3 | Specify UL Sub-frame |
| SRS TPC Command | 2 | Power control command relative to last SRS transmission |
| UL Component Carrier | 2 | Indicate 1 of 4 (pre-configured) UL CCs |
| CRC (UE ID) | 16 | UE ID masked in the CRC |
| TOTAL | $\leq 30 + 4 \times N_{ant}$ | |

While the present invention has been shown and described with reference to certain embodiments thereof, it will be understood by those skilled in the art that various changes in form and detail may be made therein without departing from the spirit and scope of the present invention as defined by the appended claims.

What is claimed is:

1. A method for a base station in a wireless communication system, the method comprising:
   transmitting, to a user equipment (UE), downlink control information (DCI) including reference signal (RS) request information, the RS request information including one or two binary elements based on a DCI format,
   wherein, if a first RS transmission triggered by the RS request information and a second RS transmission triggered by radio resource control (RRC) signaling occur in a same subframe, an RS for the first RS transmission is transmitted by the UE.

2. The method of claim 1, wherein the RS for the first RS transmission is transmitted once by the UE.

3. The method of claim 1, wherein parameters for the first RS transmission and parameters for the second RS transmission are configured to the UE by the RRC signaling.

4. A method for a user equipment (UE) in a wireless communication system, the method comprising:
   receiving, from a base station, downlink control information (DCI) including reference signal (RS) request information, the RS request information includes one or two binary elements based on a DCI format; and
   transmitting an RS for a first RS transmission if the first RS transmission triggered by the RS request information and a second RS transmission triggered by radio resource control (RRC) signaling occur in a same subframe.

5. The method of claim 4, wherein the RS for the first RS transmission is transmitted once by the UE.

6. The method of claim 4, wherein parameters for the first RS transmission and parameters for the second RS transmission are configured to the UE by the RRC signaling.

7. A base station in a wireless communication system, the base station comprising:
   a transceiver configured to transmit and receive signals; and
   a controller configured to control the transceiver to:
   transmit, to a user equipment (UE), downlink control information (DCI) including reference signal (RS) request information, the RS request information including one or two binary elements based on a DCI format,
   wherein, if a first RS transmission triggered by the RS request information and a second RS transmission triggered by radio resource control (RRC) signaling occur in a same subframe, an RS for the first RS transmission is transmitted by the UE.

8. The base station of claim 7, wherein the RS for the first RS transmission is transmitted once by the UE.

9. The base station of claim 7, wherein parameters for the first RS transmission and parameters for the second RS transmission are configured to the UE by the RRC signaling.

10. A user equipment (UE) in a wireless communication system, the UE comprising:
    a transceiver configured to transmit and receive signals; and
    a controller configured to control the transceiver to:
    receive, from a base station, downlink control information (DCI) including reference signal (RS) request information, the RS request information including one or two binary elements based on a DCI format, and
    transmit an RS for a first RS transmission if the first RS transmission triggered by the RS request information and a second RS transmission triggered by radio resource control (RRC) signaling occur in a same subframe.

11. The UE of claim 10, wherein the RS for the first RS transmission is transmitted once by the UE.

12. The UE of claim 10, wherein parameters for the first RS transmission and parameters for the second RS transmission are configured to the UE by the RRC signaling.

* * * * *